United States Patent
Ramalho et al.

(10) Patent No.: US 10,306,181 B2
(45) Date of Patent: May 28, 2019

(54) LARGE SCALE MEDIA SWITCHING: RELIABLE TRANSPORT FOR LONG TERM REFERENCE FRAMES

(71) Applicant: Cisco Technology, Inc., San Jose, CA (US)

(72) Inventors: Michael Anthony Ramalho, Lakewood Ranch, FL (US); Greg Harald Hakonsen, Sokna (NO)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 15/290,280

(22) Filed: Oct. 11, 2016

(65) Prior Publication Data

US 2018/0103233 A1 Apr. 12, 2018

(51) Int. Cl.
| | | |
|---|---|---|
| *H04N 7/14* | (2006.01) | |
| *H04L 29/06* | (2006.01) | |
| *H04N 7/15* | (2006.01) | |
| *H04N 19/00* | (2014.01) | |
| *H04N 21/63* | (2011.01) | |

(52) U.S. Cl.
CPC .......... *H04N 7/147* (2013.01); *H04L 65/403* (2013.01); *H04L 65/4069* (2013.01); *H04L 65/602* (2013.01); *H04L 65/608* (2013.01); *H04N 7/15* (2013.01); *H04N 19/00* (2013.01); *H04N 21/631* (2013.01)

(58) Field of Classification Search
CPC ...... H04N 7/147; H04N 19/00; H04N 21/631; H04N 7/15; H04L 65/602; H04L 65/403; H04L 65/608; H04L 65/4069
See application file for complete search history.

(56) References Cited

U.S. PATENT DOCUMENTS

| | | | |
|---|---|---|---|
| 8,494,049 B2 | 7/2013 | Buttimer et al. | |
| 8,629,893 B2 | 1/2014 | Friel et al. | |
| 9,077,964 B2 | 7/2015 | Cipolli et al. | |
| 9,232,244 B2 | 1/2016 | Chen et al. | |
| 2006/0248216 A1* | 11/2006 | Park | H04L 29/06027 709/231 |

(Continued)

OTHER PUBLICATIONS

Giorcelli, et al., "QoS Strategies and Smart Media Techniques for Collaboration Deployments", BRKCOL-2616 Cisco Live!, 138 pages, 2015, Cisco.

(Continued)

*Primary Examiner* — Neil R Mikeska
(74) *Attorney, Agent, or Firm* — Behmke Innovation Group, LLC; James Behmke; Stephen Lebarron

(57) ABSTRACT

In one embodiment, a device in a network sends a long term reference frame of a video stream to one or more nodes in the network using a reliable transport mechanism. Subsequent to sending the long term reference frame, the device sends a sequence of regular frames of the video stream to the one or more nodes using an unreliable transport mechanism, whereby a frame in the sequence is derived from a directly prior frame in the sequence. The device identifies an expiration of a wait time from when the long term reference frame was first sent. The device sends a regular frame derived from the long term reference frame via the unreliable transport mechanism after the expiration of the wait time and subsequent to sending the sequence of regular frames.

20 Claims, 7 Drawing Sheets

(56) References Cited

U.S. PATENT DOCUMENTS

| | | | | |
|---|---|---|---|---|
| 2007/0033494 | A1* | 2/2007 | Wenger | H04N 19/147 |
| | | | | 714/776 |
| 2011/0083156 | A1* | 4/2011 | Martinez | H04N 7/17318 |
| | | | | 725/118 |
| 2011/0142034 | A1* | 6/2011 | Wu | H04N 21/2343 |
| | | | | 370/352 |
| 2011/0283009 | A1* | 11/2011 | Martinez | H04N 21/6125 |
| | | | | 709/231 |
| 2013/0283037 | A1* | 10/2013 | Katz | H04L 63/04 |
| | | | | 713/151 |
| 2015/0011311 | A1* | 1/2015 | Relan | A63F 13/355 |
| | | | | 463/31 |
| 2015/0373075 | A1* | 12/2015 | Perlman | H04L 65/608 |
| | | | | 709/217 |

OTHER PUBLICATIONS

Porter, et al., "Hybrid TCP/UDP video transport for H.264/AVC content delivery in burst loss networks", 2011 IEEE International Conference on Multimedia and Expo, 978-1-61284-349-0, Barcelona, Spain., Jul. 2011, 5 pages, IEEE.

Sinky, et al., "Analysis of H.264 Bitstream Prioritization for Dual TCP/UDP Streaming of HD Video Over WLANs", 2015 12th Annual IEEE Consumer Communications and Networking Conference (CCNC), 978-1-4799-6389-8, Las Vegas, NV., Jan. 2015, pp. 576-581, IEEE.

Zhao et al. Flexible Dual TCP/UDP Streaming for H.264 HD Video Over WLANs; pp. 1-9.

* cited by examiner

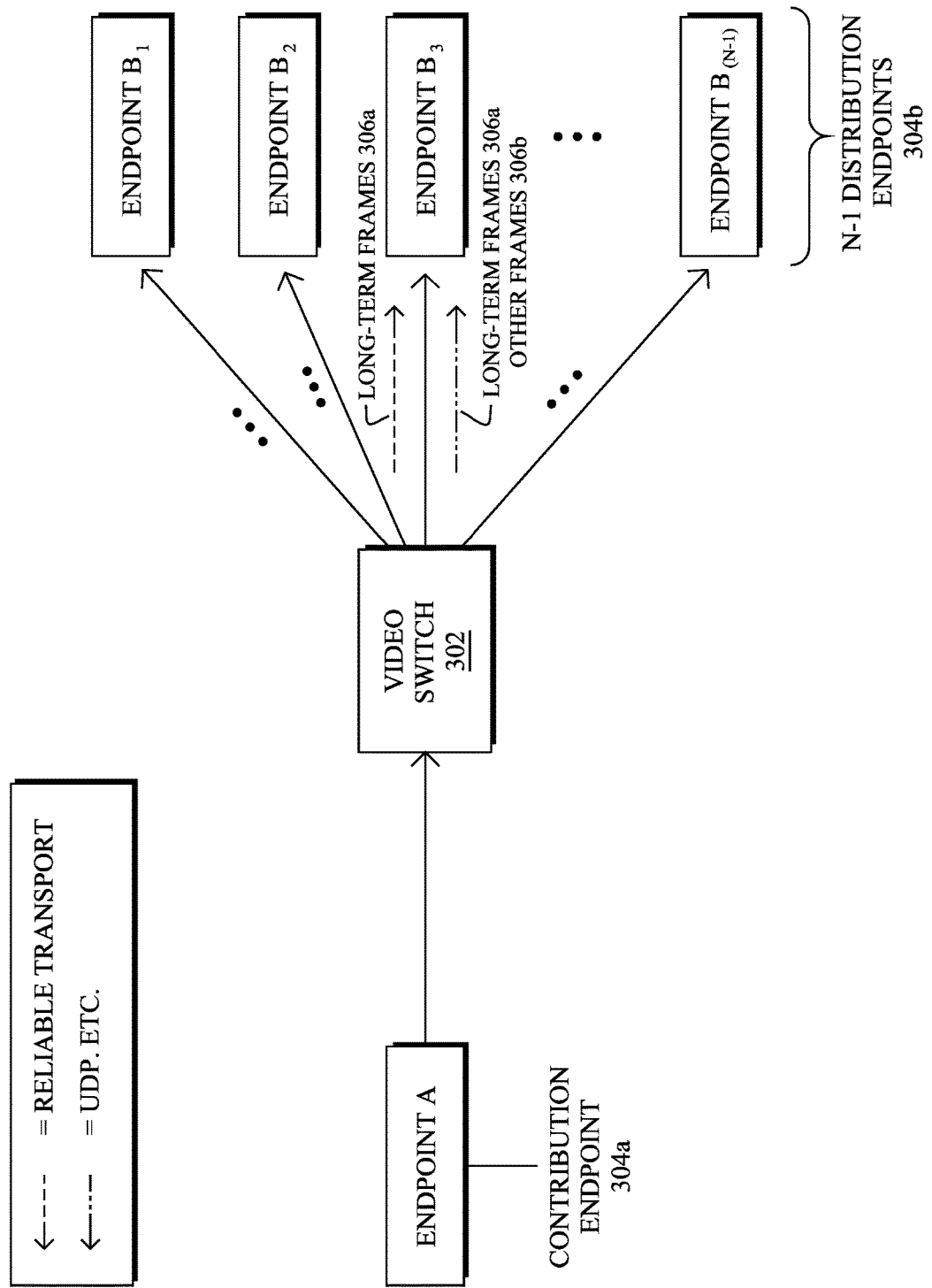

LARGE SCALE MEDIA SWITCHING: RELIABLE TRANSPORT FOR LONG TERM REFERENCE FRAMES

TECHNICAL FIELD

The present disclosure relates generally to computer networks, and, more particularly, to a reliable transport for long term reference frames of a media session.

BACKGROUND

Various forms of media sessions may be established in a communication network. For example, a media session may support conferencing (e.g., with multiple speakers or presenters), content streaming (e.g., from a single source to an audience), fax communications, application sharing, and the like. Such a session may convey media of a particular type, such as audio or video, or, alternatively, be a multimedia session that conveys multiple forms of media at the same time (e.g., a video conference with audio, etc.).

Typically, media session data is sent as User Datagram Protocol (UDP) packets. UDP packets, in contrast to Transmission Control Protocol (TCP) packets, are often well suited for media applications. In particular, UDP packets use smaller headers than TCP packets and are often processed faster than TCP packets. In addition, unlike TCP, UDP is considered to be an unreliable transport mechanism, as UDP does not guarantee delivery of any given packet. As there is no mechanism to ensure delivery of any given packet during a typical UDP-based media session, loss of critical packets (e.g., packets associated with a key event, etc.) can lead to degradation of the user experience.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5B illustrate examples of video frames being sent using reliable and unreliable transport mechanisms.

DESCRIPTION OF EXAMPLE EMBODIMENTS

Overview

According to one or more embodiments of the disclosure, a device in a network sends a long term reference frame of a video stream to one or more nodes in the network using a reliable transport mechanism. Subsequent to sending the long term reference frame, the device sends a sequence of regular frames of the video stream to the one or more nodes using an unreliable transport mechanism, whereby a frame in the sequence is derived from a directly prior frame in the sequence. The device identifies an expiration of a wait time from when the long term reference frame was first sent. The device sends a regular frame derived from the long term reference frame via the unreliable transport mechanism after the expiration of the wait time and subsequent to sending the sequence of regular frames.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others.

Figure 1:
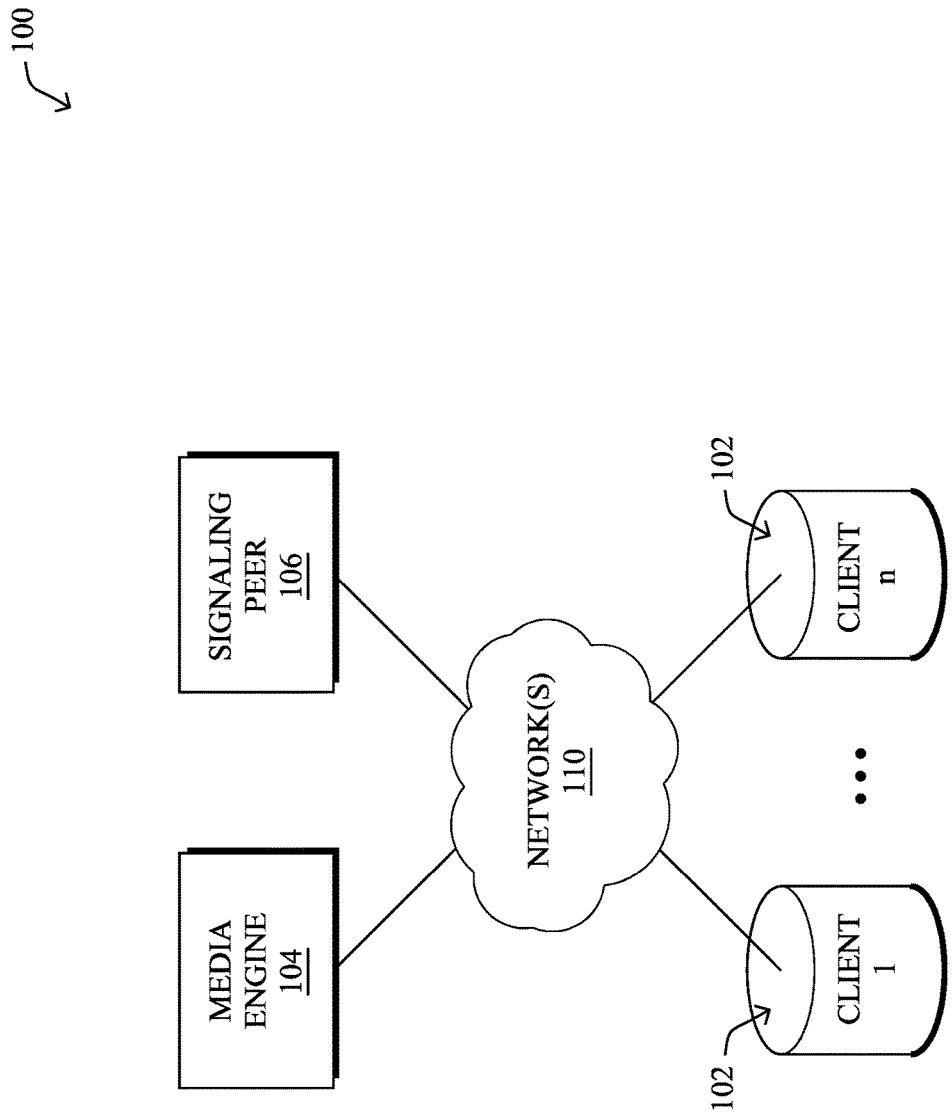
FIG. 1 illustrates an example computing system.

FIG. 1 is a schematic block diagram of an example computing system 100 illustratively comprising any number of client devices 102 (e.g., a first through nth client device), a media engine 104, and a signaling peer 106 in communication with one another via any number of networks 110. The one or more networks 110 may include, as would be appreciated, any number of specialized networking devices such as routers, switches, access points, etc., interconnected via wired and/or wireless connections. For example, devices 102-106 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, PLC, etc.

Client devices 102 may include any number of user devices configured to participate in a media session in which media data is communicated between the participating devices (e.g., audio, video, text, etc.) via network(s) 110. For example, client devices 102 may include, but are not limited to, desktop computers, laptop computers, tablet devices, smart phones, other telephonic devices, wearable devices (e.g., heads up devices, smart watches, etc.), set-top devices, smart televisions, or any other form of computing device capable of participating in a real-time media session via network(s) 110 (e.g., via a web-based application/browser or the like). Client devices 102 may, in further cases, include other devices that handle signaling and media during a real-time communication session. For example, in various embodiments, client devices 102 may include Internet Protocol (IP) telephony devices, a back-to-back user agent (B2BUA), a session border controller (SBC), a Public Switched Telephone Network (PSTN) gateway, etc.

Media engine 104 may be configured to facilitate the transfer of media data between any number of client devices 102 during a media session. Generally, a media engine may be a logical entity than can be configured to facilitate the sending and receiving of data of different types. The actual data types that are communicated via media engine 104 may be negotiated using a signaling channel controlled by signaling peer 106. Example media sessions may include, but are not limited to, voice calls, video conferencing, point to multipoint (P2MP) media streaming, application sharing, and other forms of communicating data in a computer network in real-time. In some embodiments, media engine 104 may be configured to process the communicated media, prior to sending the media on to the endpoint client devices 102. For example, in the case of a voice conference, media engine 104 may merge audio streams from different speakers into a finalized audio stream for the endpoint devices.

Signaling peer 106 may be configured to provide the signaling for a given media session between client devices 102. In particular, signaling peer 106 may implement a signaling protocol to establish a media session between client devices 102. For example, signaling peer 106 may use the Session Initiation Protocol (SIP), the Jingle extension to Extensible Messaging and Presence Protocol (XMPP), WebRTC, or any other media session signaling protocol, to initiate and control a media session between client devices 102 and media engine 104.

Those skilled in the art will understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure. For example, while media engine 104 and signaling peer 106 are illustrated as separate devices, their respective functions described herein may be implemented as a single device, or as part of a cloud-based architecture, in other configurations. In another embodiment, media engine 104 may be implemented as a set of services or micro-services running on one or more virtual machines (VMs), in which case media engine 104 represents the aggregated set of services. In yet another embodiment, some or all of the functions of media engine 104 described herein may be implemented as part of any of client devices 102 shown.

Figure 2:
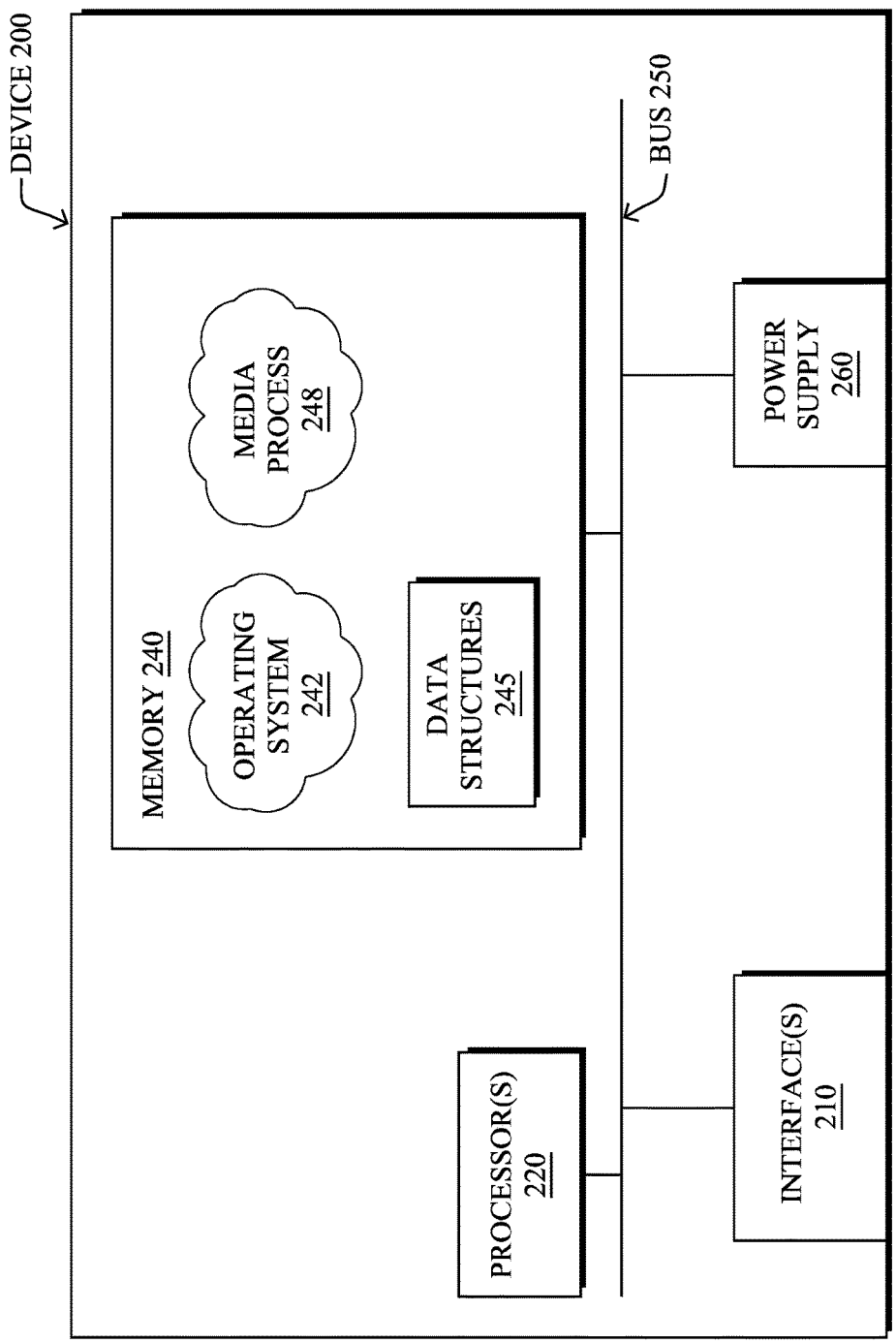
FIG. 2 illustrates an example network device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a media process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Generally, media process 248, when executed by processor(s) 220 may be configured to enable a media session between any number of devices participating in the session. For example, when executed by a conference participant, media process 248 may be operable to send media data generated by local device 200 (e.g., audio, video, etc.) to any or all of the other conference participant devices (e.g., via a conference server/media engine). Similarly, when media data is received from another conference participant, media process 248 may be operable to process the received data and/or present the media data to a user via a user interface (e.g., a display, speaker, etc.). Further examples include the sending of streaming media (e.g., streaming video) from one node/device to one or more other nodes/devices for presentation to their respective users.

As noted above, many online media sessions use unreliable transport mechanisms (e.g., UDP) to convey the media through the network. Thus, there is the ever present risk of packet loss during transit that may affect the user experience. To alleviate some of this impact, many media encoders use encoding mechanisms designed to help conceal the effects of network conditions (e.g., loss, delays, jitter, etc.) from the user. For example, many video encoders use compression techniques that separate video frames into different categories: Intracoded (I)-frames, Predicted (P)-frames, and, sometimes, Bi-Predictive (B)-frames.

Generally, I-frames are full images that can be displayed on their own without any processing of additional frames. P-frames, in contrast, only include the changes from a prior frame and, thus, typically are smaller in size. For example, while an I-frame may include all of the image information to depict an object in front of a static background, a subsequent P-frame may only include the differences in the location of the object, while excluding the background entirely. In a normal mode of operation, P-frames are derived from immediately prior P frames which were, in turn, derived from prior P-frames making a reference chain back to an I-frame. B-frames work in a similar manner to that of P-frames, but instead reference both their preceding and subsequent frames.

In some embodiments, the system may allow for the use of multiple long term (LT) reference frames. These LT reference frames are typically I-frames or P-frames and can be labeled as LT reference frames by the video encoder. In turn, the decoder of the receiving client device will then store the decoded versions of these LT frames for potential use by later P frames. The most current versions of these LT frames are typically stored by the decoder by freeing space occupied by older references." For example, in some implementations, the encoder may send a so-called "repair frame" that is a P-frame that does not reference the immediately prior P-frame, but rather a P-frame in the past that it proactively labeled as an LT reference. In other words, the encoder may generate a repair frame using an earlier LT frame as a reference. Such a mechanism is supported by H.264 and HEVC, but not all coders exploit this feature. However, this scheme requires the encoder to know the synchronization state of each receiving decoder to work.

Notably, an earlier LT frame can only be used as a reference for a repair frame if it is known that all decoders where in a synchronized state when they decoded that particular LT frame.

While the above repair frame strategy works well for small scale conferences, there are some issues when it comes to larger switched conferences. First, the repair frame strategy relies on all of the decoders in the conference to have received the LT frames and that there is an unbroken chain all the way back to the first I-frame for all decoders. As switched conferences get larger, however, the probability of all decoders receiving any given frame becomes increasingly lower.

Figure 3:
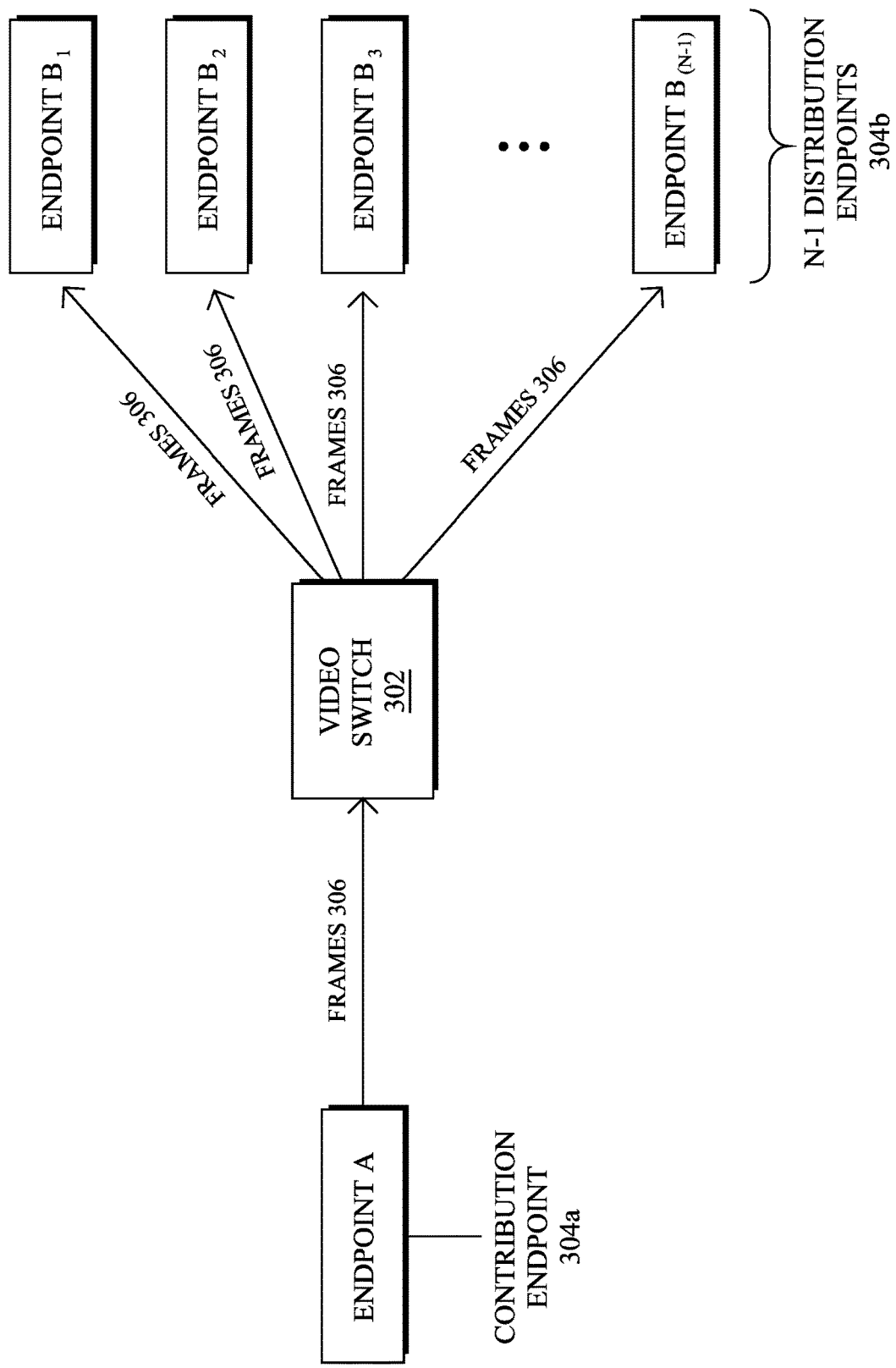
FIG. 3 illustrates an example switched conferencing system.

An example of a switched conferencing system is shown in FIG. 3, according to some embodiments. As shown, any number (e.g., N-number) of endpoint devices 304 may participate in a video conference. During such a conference, one of the endpoint devices, contribution endpoint 304a may encode video data into frames 306 and send frames 306 to any number of distribution endpoints 304b (e.g., N-1 number of endpoints) via a video switch 302. In turn, endpoints 304b may decode the received frames 306 and present the video to their corresponding displays.

When dealing with loss and packet transport in large switched conferences, such as that illustrated in FIG. 3, there are a couple of key issues that needs to be considered:

1.) The distribution endpoints 304b that are having network problems (e.g., packet loss, etc.) and, consequently, are not synchronized, should be re-synchronized within a reasonable time. This normally involves a repair being requested of the video source, contribution endpoint 304a. However, there is extra bandwidth consumption associated with this repair. In particular, such as in the case of switching topologies shown, the repair goes to all distribution endpoints 304b, even though they did not all need the repair, thereby consuming bandwidth for all of endpoints 304b.

2.) The distribution endpoints 304b that do not experience network problems should be impacted as little as possible. Unfortunately, the bandwidth consumed by repairs going to all of endpoints 304b effectively take away incremental video quality improvements that might have been possible had the repair bandwidth not been needed.

Given the above, it can be seen that a few distribution endpoints 304b having poor transport negatively affect the quality of all of the other endpoints 304b, in a large scale conference. Usually, when a video stream is encoded and then decoded with multiple decoders, these problems can be alleviated by sending refresh frames (e.g., I-frames) cyclically (e.g., every $n^{th}$ frame). Each refresh frame will then clear up any out-of-synchronization issues that might have occurred. To address each of the specific requirements above, the refresh frames should be sent frequently. However, doing so is not without cost, as refresh frames are typically on the order of 20-30 times larger than regular P-frames. This means that keeping a constant transmit rate means that the receiving decoder needs to use a larger buffer to accommodate the refresh frames, leading to a larger delay.

Large Scale Media Switching: Reliable Transport for Long Term Reference Frames

The techniques herein provide a mechanism that ensures that the video experience is not degraded for the vast majority of distribution endpoints due to some of the endpoints experiencing poor network performance. In some aspects, the techniques herein propose the use of a reliable transport mechanism to transmit LT reference frames from a sender that: 1.) greatly reduces the repair information that would otherwise have to be aggregated and propagated back to the sender, 2.) reduces unnecessary repair bandwidth consumed by repairs sent to distribution endpoints that do not require repair, thereby allowing for more bandwidth usage for higher quality video, and 3.) reduces latency and visual artifacts experienced by distribution endpoints without network issues.

Specifically, according to one or more embodiments of the disclosure as described in detail below, a device in a network sends a long term reference frame of a video stream to one or more nodes in the network using a reliable transport mechanism. Subsequent to sending the long term reference frame, the device sends a sequence of regular frames of the video stream to the one or more nodes using an unreliable transport mechanism, whereby a frame in the sequence is derived from a directly prior frame in the sequence. The device identifies an expiration of a wait time from when the long term reference frame was first sent. The device sends a regular frame derived from the long term reference frame via the unreliable transport mechanism after the expiration of the wait time and subsequent to sending the sequence of regular frames.

Illustratively, the techniques described herein may be performed by hardware, software, and/or firmware, such as in accordance with the media process 248, which may include computer executable instructions executed by the processor 220 (or independent processor of interfaces 210) to perform functions relating to the techniques described herein.

Figure 4:
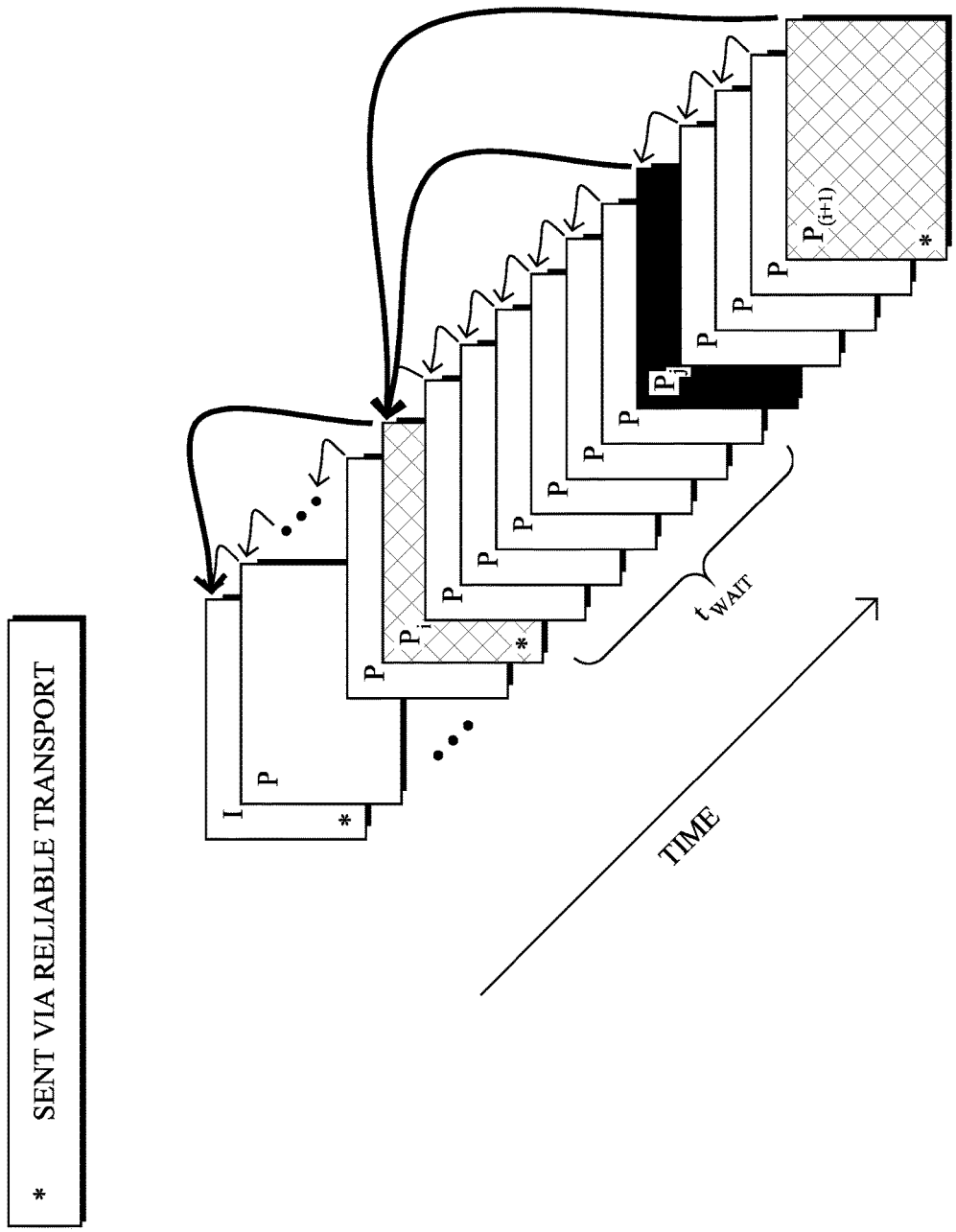
FIG. 4 illustrates an example set of video frames.

Operationally, FIG. 4 illustrates an example set of video frames generated in accordance with the teachings herein. As shown, the encoder (e.g., contribution endpoint 304a of FIG. 3) may generate and send a series of frames 306 over time. In various embodiments, the encoder may generate and send LT reference frames periodically that only refer to a previous LT reference frame. Such LT frames may comprise I-frames, such as an initial I-frame and/or refresh P-frames. For example, refresh frame $P_i$ may refer to the initial I-frame in frames 306 shown and refresh frame $P_{(i+1)}$ may refer to the prior LT reference frame, $P_i$. Such LT reference frames form a low frame rate (and thus low bandwidth) reference with which all of the decoders can resynchronize within a reasonable amount of time.

In addition to the LT reference frames I, $P_i$, and $P_{i+1}$ shown, the encoder may intersperse any number of regular frames (e.g., regular P-frames) between the sending of the LT reference frames. In other words, the encoder may send LT reference frames periodically as part of a video stream that comprises primarily regular P-frames, or potentially B-frames, that are typically smaller in size than the LT reference frames.

According to various embodiments, the contribution endpoint sending frames 306 may send the LT reference frames using a reliable transport mechanism, such as TCP, a Hypertext Transfer Protocol (HTTP) PUT that encapsulates the LT reference frame, or any other transport mechanism that operates to ensure the eventual delivery of data across a network. Conversely, the contribution endpoint may send the regular frames (e.g., the non-LT P-frames) via an unreliable transport mechanism, such as UDP.

While sending the LT reference frames via a reliable transport and the regular frames via unreliable transport may reduce repair bandwidth usage, further enhancements provide for the modification to the stream of regular frames sent between LT reference frames. In particular, by sending an LT reference frame via reliable transport, it can be assumed that the LT reference frame will reach the distribution endpoints within a certain amount of time (denoted $t_{WAIT}$). For example, as shown, assume that $t_{WAIT}$ amount of time has elapsed since LT reference frame $P_i$ was first sent and that the probability of the endpoint receiving frame $P_i$ is 95% after the elapse of $t_{WAIT}$. In other words, $t_{WAIT}$ may be set to allow for a reasonable number of retransmissions of an LT reference frame such that the probability of reception by the endpoint is above a threshold amount.

In various embodiments, after expiration of the wait time, $t_{WAIT}$, after sending an LT reference frame, the contribution endpoint may modify the next regular frame to be sent to refer to previous LT reference frame instead of the immediately prior frame, as usual. For example, after sending LT reference frame $P_i$, the contribution endpoint may then send any number of regular P-frames that each reference the immediately prior frame until expiration of $t_{WAIT}$. At this time, instead of sending another regular frame that references its immediately prior frame, the contribution endpoint may instead send a regular frame (e.g., $P_j$) that references the most recently sent LT reference frame, $P_i$. Note that doing so will mean that frame $P_j$ is highly likely to be larger in size than those regular frames in the preceding sequence. However, since LT reference frame $P_i$ is guaranteed to arrive within $t_{WAIT}$ with a threshold probability, this means that the distribution endpoint is also guaranteed to be able to use $P_j$ to become re-synchronized at this time with the same probability. As would be appreciated, this can be accomplished without any repair signaling back to the contribution endpoint/video source, thereby further reducing the bandwidth consumption by repair signaling.

As a network does not usually differentiate between the datagrams sent via UDP or TCP, the typical case is that all P-frames will traverse the network with nearly identical nominal delay. However, if any frames sent by TCP or another reliable transport mechanism are lost (and, thus, $P_i$ or a portion thereof was lost), those frames will eventually be retransmitted. This means that the usual case is that packet losses affect the "first transmission" of all P-frames equally, but the frames transported via TCP will eventually get to the decoder. This allows the decoder receiving only these LT reference frames (e.g., frames $P_i$ and $P_{i+1}$) should still get a fully synchronized video stream without any request for repair being sent to the encoder.

Notably, by sending the LT reference frames using a reliable transport mechanism (e.g., TCP, encapsulated in an HTTP PUT, etc.), the contribution side does not need to worry about what happens to these LT reference frames. The bit size of the LT reference frames will usually be larger than a regular P-frame but, in most cases, the size will be in the order of 2-3× the size of a regular P-frame.

Figure 5A:
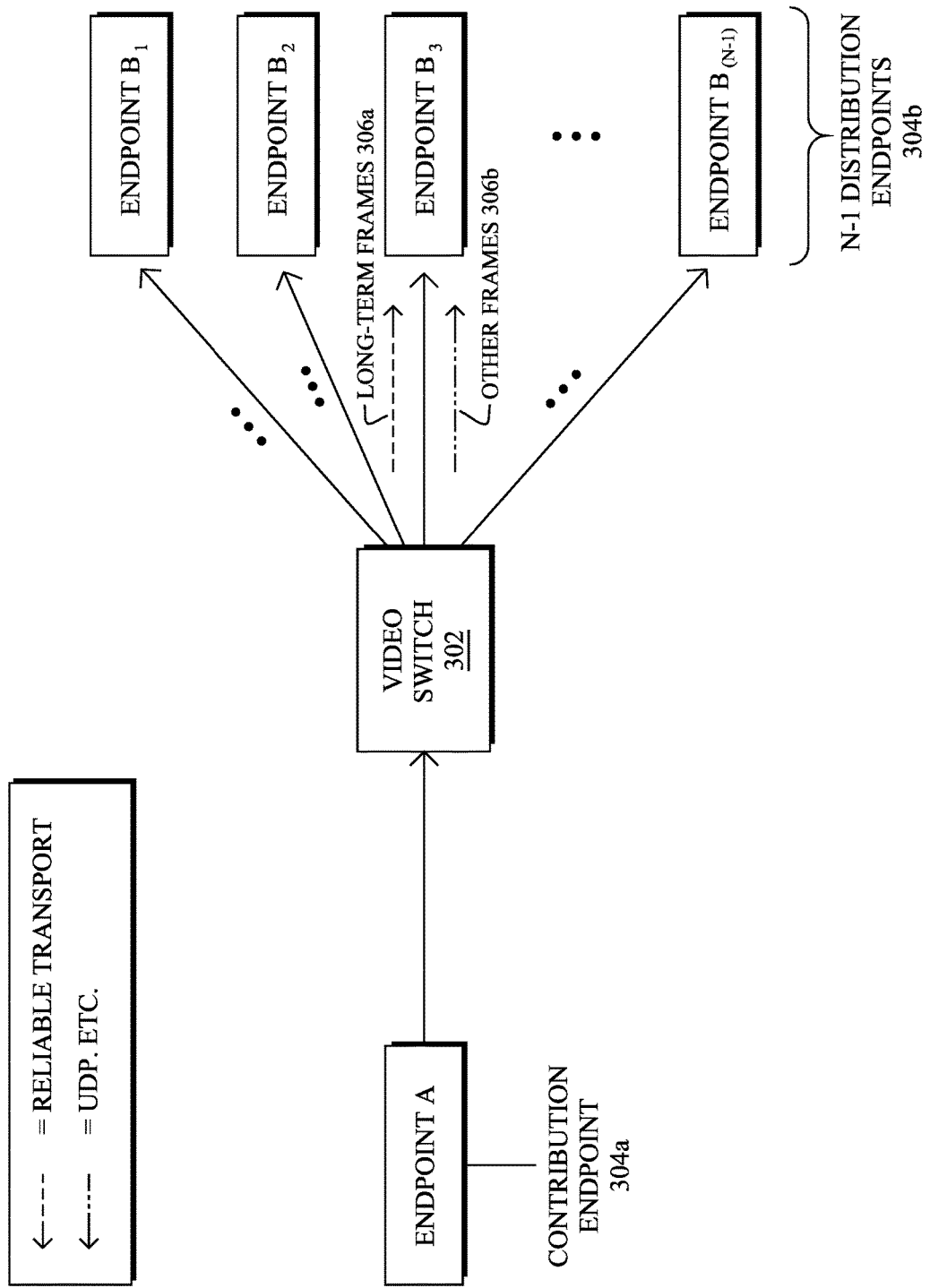

FIGS. 5A-5B illustrate examples of video frames being sent using reliable and unreliable transport mechanisms, according to various embodiments. There are multiple scenarios for employing both reliable and unreliable transport mechanisms to send a video stream in a network. As shown in FIG. 5A, contribution endpoint 304a may send the LT reference frames 306a (e.g., the I-frame and reference frames $P_i$ and $P_{i+1}$ shown in FIG. 4) only via reliable transport, such as TCP, HTTP PUT, etc. Conversely, contribution endpoint 304a may send the other frames 306b in the stream via an unreliable transport mechanism, such as UDP. Note that the decoders of distribution endpoints 304b will need to receive both modes of transport to get the full frame rate.

In another case, as shown in FIG. 5B, contribution endpoint 304a may instead send LT reference frames 306a via both the reliable and unreliable transport mechanisms. Thus, the stream of frames sent via the unreliable transport mechanism may be a full frame rate stream on its own (e.g., comprising both LT reference frames 306a and the other frames 306b.

In the case shown in FIG. 5A, the extra bandwidth used is low if LT reference frames 306a are sent infrequently (e.g., one every few seconds, etc.). For distribution endpoints 304b that do not experience network problems, there should be little or no time difference in terms of delivery between the streams sent via the reliable and unreliable transport mechanisms. Also, given the slightly larger size of the LT reference frames 306a, the extra delay for the slightly larger frames will be small. For those distribution endpoints 304b that experience network problems, the endpoints will be able to be resynchronized with the encoder each time a new LT reference frame 306a arrives over the reliable transport.

If the transport on a distribution leg is so poor that more than the anticipated number of retransmissions has occurred, the decoder will not be able to decode the specialized/resynchronization frame (e.g., frame $P_j$ shown in FIG. 4) when it arrives. In this case, the distribution endpoint 304b experiencing the transport issue will either need to buffer the required chain of reference frames (e.g., $P_i$ frames) to get back in synchronization by decoding $P_j$, which will result in a delay, or skip decoding $P_j$ entirely and wait for the next $P_{(i+1)}/P_{(j+1)}$ pair to arrive (e.g., start decoding from the next $P_{(j+1)}$ which occurs after the $t_{WAIT}$ following $P_{(i+1)}$), which would result in a freeze. However, even in this worst-case scenario, no signaling back to contribution endpoint 304a is needed, although a new IDR request could be made.

In further embodiments, while the use of $P_j$ frames and a defined $t_{WAIT}$ may improve the user experience, other embodiments provide for the removal of such a feature. In particular, all long term frames (e.g., I-frames, etc.) may be sent via reliable transport and all P-frames will just refer to the previous frame.

In the specific case shown in FIG. 5B, addition bandwidth is used to send the LT reference frames via both transport mechanisms, but the distribution endpoints 304b that do not experience network problems do not need to merge the two transport methods. In other words, these endpoints 304b that receive LT reference frames 306a without issue via the unreliable transport mechanism can simply ignore the duplicates sent via the reliable transport mechanism. Additionally, endpoints 304b that experience network problems can still decode as much as possible from the frames sent via the unreliable transport mechanism and fill in the gaps using the reliable transport mechanism, as needed.

As it is the contribution endpoint 304a that generates the video stream, contribution endpoint 304a may also use hybrid reliable and unreliable transport to send frames 306 to video switch 302 as well, in one embodiment. However, loss in the unreliable stream will be seen by all of distribution endpoints 304b.

There are many ways the reliable stream can be implemented, in various embodiments. First, if it is assumed that the reliable transport stream is low bandwidth relative to the full rate stream, one could simply probe the send window of the outbound TCP socket, to determine whether the transport layer at the other end has received the packets, since the send window should be at its maximum level if all bytes were already acknowledged at the TCP layer. Doing so would not even require an application layer ACK/NACK of the receiving endpoint/switch that the packet/frame arrived. There are, of course, many other ways that the endpoint/switch could request retransmission of a lost frame, or portion of a frame, in other implementations. Lastly the wait time, $t_{WAIT}$ can be provisioned based on the measured round trip times (RTTs) of the endpoints (e.g., from RTCP data) and set to some appropriate value (e.g., 2 or 3 retransmits or some other provisioned/configured value such as 300 ms).

Figure 6:
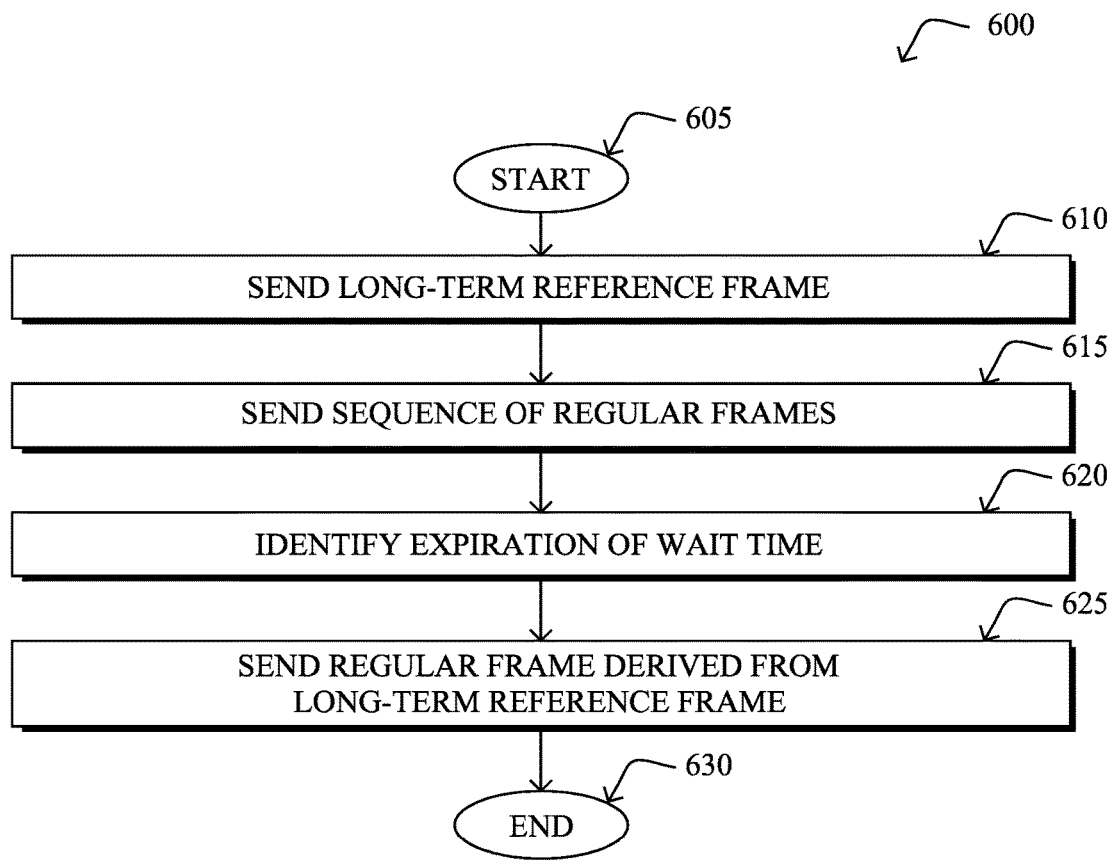
FIG. 6 illustrates an example simplified procedure for sending frames of a video stream.

FIG. 6 illustrates an example simplified procedure for sending frames of a video stream in a network in accordance with one or more embodiments described herein. For example, a non-generic, specifically configured device (e.g., device 200) may perform procedure 400 by executing stored instructions (e.g., process 248). The procedure 600 may start at step 405, and continues to step 610, where, as described in greater detail above, the device may send a long term reference frame of a video stream to one or more nodes in the network using a reliable transport mechanism. In general, long term reference frames may be I-frames or specialized P-frames that refer back to the previous long term reference frame instead of its directly prior frame in the stream. The reliable transport mechanism may be any transport mechanism that detects transmission errors and attempts to correct for these errors. For example, TCP uses an acknowledgement technique to ensure that the endpoint actually received the communication.

At step 615, as detailed above, the device may send a sequence of regular video frames to the node(s), subsequent to sending the reference frame in step 610. A frame in this sequence may simply refer to its immediately prior frame in the sequence. For example, the sequence may comprise a set of regular P-frames. Generally, and in contrast to reliable transport mechanisms, an unreliable transport mechanism does not operate to detect and account for transmission errors. For example, in one embodiment, the device may send the regular frames via UDP, which does not use an acknowledgement mechanism.

At step 620, the device may identify an expiration of a wait time from when the long term reference frame was first sent in step 610, as described in greater detail above. Generally, the wait time may be based on an amount of time needed to ensure that the receiving node(s) have received the long term reference frame within the wait time, with a threshold probability. For example, the wait time may be selected to allow for x-number of retransmissions via the reliable transport mechanism. In such a case, the corresponding probability would be the probability of the frame reaching the destination after the x-number of attempts.

At step 625, as detailed above, the device may send a regular frame derived from the long term reference frame after the expiration of the wait time and subsequent to sending the sequence of regular frames. In contrast to most regular frames, the frame sent in step 625 may be derived from the long term reference frame instead of the most recently sent frame of the sequence of regular frames. In other words, rather than referring to its directly prior frame, the frame sent in step 625 may instead refer to the long term reference frame sent in step 610. In turn, this allows the receiver to resynchronize using the long term reference frame, which has likely arrived after expiration of the wait time, and the frame derived from the long term reference frame sent in step 625. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, greatly reduce the amount of repair information that would ordinarily need to be both aggregated and propagated back to the contribution endpoint of a video stream. The techniques herein also reduce the use of bandwidth unnecessarily to send repair information to distribution endpoints that do not require repair. Doing so allows the system to dedicate more bandwidth for the highest quality video. Further, the techniques herein provide for deterministic times/intervals and keep latency as low as possible while still maintaining a high frame rate.

While there have been shown and described illustrative embodiments that provide for the sending of long term reference frames in a large scale video switching system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as TCP and UDP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    sending, by a device in a network, an intra-coded (I) frame of a video stream to one or more nodes in the network using a reliable transport mechanism;
    subsequent to sending the I frame, sending, by a device in a network, a long term reference frame of the video stream to the one or more nodes in the network using the reliable transport mechanism, wherein the long term reference frame refers to a prior long term reference frame or the I frame;
    subsequent to sending the long term reference frame, sending, by the device, a sequence of regular frames of the video stream to the one or more nodes using an unreliable transport mechanism, wherein a frame in the sequence is derived from a directly prior frame in the sequence;
    identifying, by the device, an expiration of a wait time from when the long term reference frame was first sent; and
    sending, by the device, a regular frame derived from the long term reference frame via the unreliable transport mechanism after the expiration of the wait time and subsequent to sending the sequence of regular frames.

2. The method as in claim 1, further comprising:
    sending, by the device, a second long term reference frame after sending the regular frame derived from the long term reference frame.

3. The method as in claim 1, wherein the long term reference frame and the regular frames are sent to the one or more nodes via a video switch in the network.

4. The method as in claim 1, wherein the unreliable transport mechanism comprises the User Datagram Protocol (UDP).

5. The method as in claim 1, wherein the wait time is based on an amount of time needed to ensure receipt of the long term reference frame by the one or more node(s) with a threshold probability.

6. The method as in claim 1, further comprising:
sending, by the device, a copy of the long term reference frame to the one or more nodes using the unreliable transport mechanism.

7. The method as in claim 1, wherein the reliable transport mechanism comprises the Transmission Control Protocol (TCP).

8. The method as in claim 1, wherein the video stream is part of an online conference.

9. The method as in claim 1, wherein a particular one of the one or more nodes uses the regular frame derived from the long term reference frame to resynchronize the video stream.

10. An apparatus, comprising:
one or more network interfaces to communicate with a network;
a processor coupled to the network interfaces and configured to execute one or more processes; and
a memory configured to store a process executable by the processor, the process when executed operable to:
send an intra-coded (I) frame of a video stream to one or more nodes in the network using a reliable transport mechanism;
subsequent to sending the I frame, send a long term reference frame of the video stream to the one or more nodes in the network using the reliable transport mechanism, wherein the long term reference frame refers to a prior long term reference frame or the I frame;
subsequent to sending the long term reference frame, send a sequence of regular frames of the video stream to the one or more nodes using an unreliable transport mechanism, wherein a frame in the sequence is derived from a directly prior frame in the sequence;
identify an expiration of a wait time from when the long term reference frame was first sent; and
send a regular frame derived from the long term reference frame via the unreliable transport mechanism after the expiration of the wait time and subsequent to sending the sequence of regular frames.

11. The apparatus as in claim 10, wherein the process when executed is further operable to:
send a second long term reference frame after sending the regular frame derived from the long term reference frame.

12. The apparatus as in claim 10, wherein the long term reference frame and the regular frames are sent to the one or more nodes via a video switch in the network.

13. The apparatus as in claim 10, wherein the unreliable transport mechanism comprises the User Datagram Protocol (UDP).

14. The apparatus as in claim 10, wherein the wait time is based on an amount of time needed to ensure receipt of the long term reference frame by the one or more node(s) with a threshold probability.

15. The apparatus as in claim 10, wherein the process when executed is further operable to:
send a copy of the long term reference frame to the one or more nodes using the unreliable transport mechanism.

16. The apparatus as in claim 10, wherein the reliable transport mechanism comprises the Transmission Control Protocol (TCP).

17. The apparatus as in claim 10, wherein the video stream is part of an online conference.

18. The apparatus as in claim 10, wherein a particular one of the one or more nodes uses the regular frame derived from the long term reference frame to resynchronize the video stream.

19. A tangible, non-transitory, computer-readable media having software encoded thereon, the software when executed by a device in a network configured to:
send an intra-coded (I) frame of a video stream to one or more nodes in the network using a reliable transport mechanism;
subsequent to sending the I frame, send a long term reference frame of the video stream to the one or more nodes in the network using the reliable transport mechanism, wherein the long term reference frame refers to a prior long term reference frame or the I frame;
identify, by the device, an expiration of a wait time from when the long term reference frame was first sent; and
send, by the device, a regular frame derived from the long term reference frame via the unreliable transport mechanism after the expiration of the wait time and subsequent to sending the sequence of regular frames.

20. The computer-readable media as in claim 19, wherein the wait time is based on an amount of time needed to ensure receipt of the long term reference frame by the one or more node(s) with a threshold probability.

* * * * *